US006231755B1

(12) United States Patent
Mesher et al.

(10) Patent No.: US 6,231,755 B1
(45) Date of Patent: May 15, 2001

(54) DESULFURIZATION OF PETROLEUM PRODUCTS

(75) Inventors: Shaun Terrance Einar Mesher, Calgary (CA); Ralph Birchard Lloyd, Fayetteville, NC (US); Edward G. Howard, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/240,216

(22) Filed: Jan. 29, 1999

Related U.S. Application Data
(60) Provisional application No. 60/073,105, filed on Jan. 30, 1998, and provisional application No. 60/091,450, filed on Jul. 1, 1998.

(51) Int. Cl.[7] .......................... C10G 17/02; C10G 29/20; C10G 19/00
(52) U.S. Cl. .......................... 208/237; 208/219; 208/238; 208/226
(58) Field of Search ................... 208/219, 237, 208/238, 226

(56) References Cited

U.S. PATENT DOCUMENTS

| | | | |
|---|---|---|---|
| 3,282,875 | 11/1966 | Connolly et al. | 260/29.6 |
| 3,865,714 | 2/1975 | Warner | 208/238 |
| 3,931,052 | 1/1976 | Oleck et al. | 252/465 |
| 3,985,643 | 10/1976 | Milstein | 208/210 |
| 3,996,128 | 12/1976 | Espenscheid et al. | 208/89 |
| 4,082,695 | 4/1978 | Rosinski et al. | 252/465 |
| 4,089,774 | 5/1978 | Oleck et al. | 208/89 |
| 4,116,880 | 9/1978 | Olah | 252/429 R |
| 4,155,835 | 5/1979 | Antal | 208/89 |
| 4,177,163 | 12/1979 | Oleck et al. | 252/439 |
| 4,266,969 | 5/1981 | Koros | 75/58 |
| 4,271,042 | 6/1981 | Oleck et al. | 252/439 |
| 4,272,357 | 6/1981 | Rollmann | 208/89 |
| 4,288,646 | 9/1981 | Olah | 585/458 |
| 4,303,551 | 12/1981 | Vaughan | 252/430 |
| 4,306,964 | 12/1981 | Angevine | 208/210 |
| 4,330,654 | 5/1982 | Ezzell et al. | 526/243 |
| 4,334,982 | 6/1982 | Jacquin et al. | 208/216 R |
| 4,336,130 | 6/1982 | Miller et al. | 208/243 |
| 4,345,940 | 8/1982 | Koros | 75/58 |
| 4,383,916 | 5/1983 | Gutberlet et al. | 208/189 |
| 4,391,677 | 7/1983 | Harris et al. | 203/28 |
| 4,394,249 | 7/1983 | Shen | 208/89 |
| 4,397,739 | 8/1983 | Jacquin et al. | 208/210 |
| 4,419,224 | 12/1983 | Miller et al. | 208/244 |
| 4,430,198 | 2/1984 | Heck et al. | 208/112 |
| 4,442,023 | 4/1984 | Heck et al. | 502/222 |
| 4,448,677 | 5/1984 | Oleck et al. | 208/216 PP |
| 4,456,700 | 6/1984 | Oleck et al. | 502/220 |
| 4,460,458 | 7/1984 | Farcasiu | 208/252 |
| 4,481,101 | 11/1984 | Yan | 208/50 |
| 4,486,297 | 12/1984 | Matsumoto et al. | 208/211 |
| 4,500,424 | 2/1985 | Simpson et al. | 208/216 PP |
| 4,508,615 | 4/1985 | Oleck et al. | 208/89 |
| 4,576,710 | 3/1986 | Nongbri et al. | 208/58 |
| 4,581,128 | 4/1986 | Plummer et al. | 208/208 R |
| 4,695,366 | 9/1987 | Miller et al. | 208/91 |
| 4,775,462 | 10/1988 | Imai et al. | 208/189 |
| 4,776,945 | 10/1988 | Washecheck et al. | 208/89 |
| 4,780,193 | 10/1988 | Derr, Jr. et al. | 208/89 |
| 4,786,405 | 11/1988 | Kutty et al. | 208/230 |
| 4,818,743 | 4/1989 | Simpson et al. | 502/211 |
| 4,827,076 | 5/1989 | Kokayeff et al. | 585/737 |
| 4,828,675 | 5/1989 | Sawyer et al. | 208/57 |
| 4,894,210 | 1/1990 | Denny et al. | 423/230 |
| 4,940,533 | 7/1990 | Simpson et al. | 208/216 R |
| 4,968,403 | 11/1990 | Herbst et al. | 208/113 |
| 5,011,593 | 4/1991 | Ware et al. | 208/213 |
| 5,034,118 | 7/1991 | Bricker et al. | 208/238 |
| 5,041,208 | 8/1991 | Patridge et al. | 208/138 |
| 5,073,349 | 12/1991 | Herbst et al. | 422/144 |
| 5,146,039 | 9/1992 | Wildt et al. | 585/820 |
| 5,202,015 | 4/1993 | Harandi | 208/119 |
| 5,258,116 | 11/1993 | McLaughlin et al. | 208/154 |
| 5,341,313 | 8/1994 | Parrott et al. | 364/578 |
| 5,346,609 | 9/1994 | Fletcher et al. | 208/89 |
| 5,378,352 | 1/1995 | Degnan et al. | 208/217 |
| 5,401,391 | 3/1995 | Collins et al. | 208/208 R |
| 5,430,212 | 7/1995 | Butt et al. | 585/526 |
| 5,482,617 | 1/1996 | Collins et al. | 208/227 |
| 5,593,567 | 1/1997 | Jessup et al. | 208/46 |
| 5,603,824 | 2/1997 | Kyan et al. | 208/208 R |
| 5,605,619 | 2/1997 | Holt | 208/213 |
| 5,607,890 | 3/1997 | Chen et al. | 502/202 |
| 5,653,866 | 8/1997 | Jessup et al. | 208/46 |
| 5,659,106 | 8/1997 | Frey et al. | 585/803 |
| 5,730,860 | 3/1998 | Irvine | 208/213 |
| 5,744,673 | 4/1998 | Skeels et al. | 585/474 |
| 5,773,480 | 6/1998 | Stone et al. | 521/27 |
| 5,780,383 | 7/1998 | Hollstein et al. | 502/324 |
| 5,824,622 | 10/1998 | Harmer et al. | 502/407 |
| 5,837,641 | 11/1998 | Gosling et al. | 502/219 |
| 5,863,419 | 1/1999 | Huff, Jr. et al. | 208/237 |

FOREIGN PATENT DOCUMENTS 2 249 316   5/1992   (GB) .

OTHER PUBLICATIONS

Lantec Products, Inc., "Why Lantec mass–transfer media?", www.lantecp.com/why.html, internet information downloaded Jun. 30, 1998.

McGraw–Hill Encyclopedia of Chemistry, Second Edition, S.P. Parker, Ed., McGraw–Hill Inc, New York (1993), p. 510–512.

Hydrocarbon Chemistry, George A. Olah & Arpad Molnar, John Wiley & Sons, Inc., New York, 1995, Chapter 2, Hydrocarbons From Petroleum and Natural Gas, p. 28–36.

*Primary Examiner*—Walter D. Griffin
*Assistant Examiner*—Tam M. Nguyen

(57) ABSTRACT

The invention discloses a process for the desulfurization of petroleum products by contacting with acidic organic polymers. Preferably, highly fluorinated and, most preferably, perfluorinated acidic organic polymers are used.

19 Claims, No Drawings

DESULFURIZATION OF PETROLEUM PRODUCTS

RELATED APPLICATIONS

This application claims benefit of U.S. Provisional Application No. 60/073,105, filed Jan. 30, 1998 and U.S. Provisional Application No. 60/091,450, filed Jul. 1, 1998.

FIELD OF THE INVENTION

This invention relates to the reduction in the organic sulfur content of petroleum products.

BACKGROUND OF THE INVENTION

Sulfur-containing compounds are present to a greater or lesser extent in petroleum and in the refined products from petroleum. Organic sulfur compounds are undesirable in petroleum products for several reasons. They can poison catalysts used in petroleum refining. In addition, the greater the amount of organic sulfur compounds in hydrocarbon fuels, such as gasoline and heating oil that are products of refining, the greater the potential for pollution when these fuels are burned. Such pollution can be reduced by treating the emissions, but treatment increases costs, and organic sulfur compounds in automotive exhaust are known poisons for automotive catalytic converters, reducing both their efficiencies and their lifetimes. Though organic sulfur compounds have always been present in petroleum and its products, the problems posed by organic sulfur compounds to refiners and consumers have increased with time. First, the demand for petroleum products is leading to the exploitation of sources of petroleum that had been previously passed over as undesirable because of high organic sulfur content. Second, more stringent environmental regulations are reducing permissible levels of sulfur in emissions and in fuels.

Methods have been developed over the years to deal with the problems posed by organic sulfur compounds in petroleum. These range from simple treatments aimed at rendering less offensive the malodorous sulfur compounds, to more complex processes to reduce or remove the sulfur compounds. The latter include absorption, extraction, oxidation, and hydrodesulfurization. A description of these processes in detail can be found in U.S. Pat. No. 4,383,916. Hydrodesulfurization is the most widely used of these processes and is growing in importance as the demand for fuels with low sulfur content increases. However, hydrodesulfurization is energy intensive, consumes expensive hydrogen gas, and requires high pressure vessels and piping. Furthermore, non-sulfur compounds in the hydrocarbon stream can be changed by hydrogenation or hydrogenolysis, and this is not always desirable. For example, under certain conditions aromatic and olefinic compounds may be hydrogenated.

In an attempt to reduce the organic sulfur concentration in hydrocarbon streams without the undesirable costs and side effects of hydrodesulfurization, acid catalysts have been employed. Acids can react with organic sulfur compounds to convert the sulfur to forms, such as hydrogen sulfide, which can be cheaply and easily removed from petroleum streams. A number of patents have disclosed acidic zeolites as catalysts for desulfurization without the accompanying use of hydrogen gas, for example, U.S. Pat. Nos. 4,383,916, 5,401,391, and 5,482,617. Zeolites are limited, however, because their acid strength is not sufficiently high for effective desulfurization. Furthermore, it can be difficult to remove fouling from the zeolites and their sensitivity to alkali limits the range of cleaning agents that may be used for this purpose.

SUMMARY OF THE INVENTION

The invention describes a process for reducing the organic sulfur content of a hydrocarbon stream by contacting it with an acidic organic polymer. Unlike hydrodesulfurization processes, a hydrogen atmosphere is not necessary to achieve effective desulfurization using the process in accordance with the invention. Preferable polymers for use in accordance with the invention are highly fluorinated, and most preferably are perfluorinated. Organic acidic polymers having sulfonic acid groups are a preferred polymer for use in accordance with the invention.

The preferred processes in accordance with the invention have been found to be especially effective in reducing the amount of intractable organic sulfur compounds in hydrocarbon streams, i.e., organic sulfur compounds not removable by alkaline extraction In a process in accordance with the invention, the preferred catalysts have long lives, are resistant to fouling because of the low surface energy and chemical inertness characteristic of fluoropolymers, and are easily regenerated because of their resistance to oxidizing agents and to strongly acidic or alkaline conditions.

DETAILED DESCRIPTION

It has been discovered that acidic organic polymers can be contacted with a hydrocarbon stream derived from petroleum at various stages in the process of refining to effectively reduce its organic sulfur content. Even brief exposure at mild temperatures to the preferred acidic organic polymers effects a significant reduction in organic sulfur content of the treated hydrocarbon stream. Such treatment is effective for reducing or eliminating offensive odors and also reducing the organic sulfur components that, though not malodorous, contribute to catalyst poisoning, and to pollution when the hydrocarbon is burned.

Though hydrogen gas may be used in a process in accordance with the invention in combination with the acidic organic polymers, hydrogen gas is not needed for effective desulfurization. Accordingly, it is preferred for the contacting of the hydrocarbon stream with the acidic organic polymer to be performed without supplying hydrogen gas to the hydrocarbon stream. Without the need for hydrogen gas, desulfurization can be achieved economically at lower pressures, and in simpler process equipment than is typically used in hydrodesulfurization processes.

Acidic organic polymers useful for the present invention include polymers with acidic functional groups including sulfonic, carboxylic, phosphonic, imide, sulfonimide and sulfonamide groups. Preferably, polymers containing sulfonic acid groups are used because of their strongly acidic character and ready commercial availability. Various known acidic organic polymers, provided that they are not soluble in the hydrocarbon stream being treated, can be used including polymers and copolymers of trifluoroethylene, tetrafluoroethylene, styrene/divinyl benzene, $\alpha,\beta,\beta$-trifluorostyrene, etc., in which acidic functional groups have been introduced. Sulfonated $\alpha,\beta,\beta$-trifluorostyrene copolymer is described in U.S. Pat. No. 5,773,480.

Preferred acidic organic polymers are highly fluorinated polymers. "Highly fluorinated" means that at least 90% of the total number of univalent atoms in the polymer are fluorine atoms. Most preferably, perfluorinated acidic organic polymers are used.

In preferred polymers for use in accordance with the invention, the polymers comprise a polymer backbone with recurring side chains attached to the backbone with the side chains carrying the cation exchange groups. In use the polymers should be principally in the acid form, that is, the proton or hydrogen ion form, though some cation exchange groups may be in the salt form, that is, associated with cations other than the proton or hydrogen ion. Especially preferred are polymers in which the side chains are fluorinated as this enhances the acidity of the ion exchange group. Highly fluorinated and perfluorinated acidic polymers for use in accordance with the invention can be homopolymers or copolymers of two or more monomers. Copolymers are typically formed from one monomer that is a nonfunctional monomer and which provides carbon atoms for the polymer backbone. A second monomer provides both carbon atoms for the polymer backbone and also contributes the side chain carrying the cation exchange group or its precursor, e.g., a sulfonyl halide group such as sulfonyl fluoride (—$SO_2F$), which can be subsequently hydrolyzed and acid exchanged to a sulfonic acid group. For example, copolymers of a first fluorinated vinyl monomer together with a second fluorinated vinyl monomer having a sulfonyl fluoride group (—$SO_2F$) can be used. By fluorinated vinyl monomer is meant a molecule with a carbon-carbon double bond in which there is at least one fluorine atom attached to a carbon atom which is doubly bonded to another carbon atom. Possible first monomers include tetrafluoroethylene (TFE), hexafluoropropylene, vinyl fluoride, vinylidene fluoride, trifluoroethylene, chlorotrifluoroethylene, perfluoro(alkyl vinyl ether), and mixtures thereof. Possible second monomers include a variety of fluorinated vinyl ethers with sulfonate ion exchange groups or precursor groups that can provide the desired side chain in the polymer. The first monomer may also have a side chain that does not interfere with the ion exchange function of the sulfonate ion exchange group. Additional monomers can also be incorporated into these polymers if desired.

A class of especially preferred polymers for use in the present invention includes a highly fluorinated, most preferably perfluorinated, carbon backbone and the side chain is represented by the formula —(O—$CF_2CFR_f)_a$—O—$CF_2CFR'_fSO_3X$, wherein $R_f$ and $R'_f$ are independently selected from F, Cl or a perfluorinated alkyl group having 1 to 10 carbon atoms, a=0, 1 or 2, and X is entirely or largely H, but may include minor amounts of Li, Na, K or N($R^1$)($R^2$)($R^3$)($R^4$) and $R^1$, $R^2$, $R^3$, and $R^4$ are the same or different and are H, $CH_3$ or $C_2H_5$. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and a side chain represented by the formula —O—$CF_2CF(CF_3)$—O—$CF_2CF_2SO_3X$, wherein X is as defined above. Polymers of this type are disclosed in U.S. Pat. No. 3,282,875 and can be made by copolymerization of tetrafluoroethylene (TFE) and the perfluorinated vinyl ether $CF_2$=CF—O—$CF_2CF$ ($CF_3$)—O—$CF_2CF_2SO_2F$, perfluoro(3,6-dioxa-4-methyl-7-octenesulfonyl fluoride) (PDMOF), followed by conversion to sulfonate groups by hydrolysis of the sulfonyl halide groups and ion exchanging to convert to the desired hydrogen ion form. One preferred polymer of the type disclosed in U.S. Pat. Nos. 4,358,545 and 4,940,525 has the side chain —O—$CF_2CF_2SO_3X$, wherein X is as defined above. This polymer can be made by copolymerization of tetrafluoroethylene (TFE) and the perfluorinated vinyl ether $CF_2$=CF—O—$CF_2CF_2SO_2F$, perfluoro(3-oxa-4-pentenesulfonyl fluoride) (POPF), followed by hydrolysis and acid exchange. Perfluorosulfonic acid polymers of the types described in this paragraph are sold under the trademark Nafion® by E.I. du Pont de Nemours, & Co., Inc. of Wilmington, Del., USA.

The ratio of the monomers with the ion exchange groups to other monomers that make up the polymer determines the acidity of the polymer, that is the equivalents of base, such as sodium hydroxide, that will be neutralized by one gram of polymer. It is convenient to describe and compare the polymers in terms of their "ion exchange ratio" or "IXR". This is defined as the number of carbon atoms in the polymer backbone in relation to the number of cation exchange groups. A wide range of IXR values for the polymer is possible. Typically, however, the IXR range used for is from about 7 to about 33. For perfluorinated polymers of the type described above, the cation exchange capacity of a polymer is often expressed in terms of equivalent weight (EW). For the purposes of this application, equivalent weight (EW) is defined to be the weight of the polymer in acid form required to neutralize one equivalent of NaOH. In the case of a sulfonate polymer where the polymer comprises a perfluorocarbon backbone and the side chain is —O—$CF_2$—CF($CF_3$)—O—$CF_2$—$CF_2$—$SO_3H$, the equivalent weight range which corresponds to an IXR of about 7 to about 33 is about 700 EW to about 2000 EW. IXR for this polymer can be related to equivalent weight using the following formula: 50 IXR+344 =EW. While generally the same IXR range is used for sulfonate polymers disclosed in U.S. Pat. Nos. 4,358,545 and 4,940,525, the equivalent weight is somewhat lower because of the lower molecular weight of the monomer unit containing the cation exchange group. For the IXR range of about 7 to about 33, the corresponding equivalent weight range is about 500 EW to about 1800 EW. IXR for this polymer can be related to equivalent weight using the following formula: 50 IXR+178 =EW.

IXR is used in this application to describe either hydrolyzed polymer which contains ion exchange groups or unhydrolyzed polymer which contains precursor groups which will subsequently be converted to the acidic form during the manufacture of the catalyst.

For the purposes of this invention it is generally desirable to have as much acidity, that is, as low an IXR, as possible consistent with having physical properties of the polymer that are suitable to the application. As acidity increases, polymer melting or softening point and physical properties such as tensile strength and modulus decrease. The optimum balance between acidity and these properties depends upon the temperatures at which desulfurization is conducted and the physical form of the catalyst.

It is desirable that the acidic organic polymer not be wet with water or other solvents that can solvate the hydrogen ion and reduce its activity. The acidic organic polymer can be dried before use. Exposure at 100–150° C. for 2–8 hours in a drying oven is adequate. If provision is made for removal of water during desulfurization, incompletely dry acidic organic polymer will improve in activity as the water is removed.

The physical form of the acidic organic polymer affects the efficiency of the desulfurization, efficiency being defined here as the rate or completeness of desulfurization per unit mass of acidic organic polymer. The acidic organic polymer is not soluble in the feedstocks being desulfurized so the contact of the feedstock with the acidic organic polymer is characteristic of two-phase systems. Therefore it is desirable to have acidic organic polymer of as high a surface area as is practical considering the character of the process equipment. High surface area can be achieved by finely dividing the acidic organic polymer, as by grinding, especially cryogenic grinding. Preferably, the surface area is at least about 0.01 m$^2$/g. More preferably, the surface area is at least about 0.1 m$^2$/g. For most uses surface area should not exceed 10 m$^2$/g.

Perfluorosulfonic acid polymer in particulate form is suitable for desulfurization. Such polymer is available commercially from E.I. du Pont de Nemours and Company in pellets of perfluorinated sulfonic acid polymer having a size of about 3 to about 4 mm. However, reaction rates with such particle size are typically lower than are desirable for most applications. Efficiency, as measured by increased rate of desulfurization, can be enhanced by reducing the size of the particles. Cryogenic grinding is one way to accomplish size reduction. A preferable size is less than about 450 μm. Still more preferable is less than about 150 μm in size. Most preferable is about 100 μm to about 1 μm in size.

Acidic organic polymer may also be used in the form of porous microcomposites comprising perfluorinated ion-exchange polymer entrapped within and highly dispersed throughout a network of silica. U.S. Pat. No. 5,824,622 discloses porous microcomposites which are useful in the practice of the present invention. During the treatment of hydrocarbon streams containing organic sulfur compounds, these porous microcomposites adsorb or absorb some of the organic sulfur compounds.

Another preferred form of high surface area acidic organic polymer is porous acidic organic polymer, preferably highly fluorinated acidic polymer, having a surface area of about 0.01 m$^2$/g to about 5 m$^2$/g and is substantially free of pores having a size of about 1.7 nm to 300 nm. Preferably, the porous catalyst contains at least about 90% by weight of highly fluorinated acid polymer. Most preferably, the polymer is perfluorosulfonic acid polymer. Since the porous polymer provides high surface area, the particles can be large, i.e, up to 50 mm, if desired. Porous acidic organic polymer of this type combines the virtues of high surface area with the easy handling, including filling, charging, filtering, and cleaning, of large particle catalysts.

In the process for making a solid acid catalyst in accordance with the invention, highly fluorinated acidic polymer or precursor thereof is exposed to a pressurized fluid to produce fluid-swelled polymer or polymer precursor. Any of a wide variety of such fluids can be used provided that they are capable of swelling the polymer of the precursor. Under the pressures used, the fluid may be in the form of a liquid, a gas or a supercritical fluid. Any suitable vessel may be used which can withstand the pressures employed. Such vessels should be acid resistant when the polymer is in acid form since it is corrosive. The pressure used should to swell the polymer with sufficient fluid so that it expands as desired in the later steps of the process.

For perfluorinated sulfonic acid polymer, the polymer is advantageously employed in either acid or sulfonyl halide precursor form. When sulfonyl halide, e.g., sulfonyl fluoride, the fluid is preferably selected from the group consisting of SO$_2$ and CO$_2$. For sulfonic acid polymer, the fluid is selected from the group consisting of SO$_2$ and CO$_2$, with the fluid further comprising water.

In the process of the invention, the fluid-swelled polymer or polymer precursor is heated to a temperature above the softening point of said fluid-swelled polymer or precursor. For perfluorinated sulfonyl fluoride polymer, this temperature is typically in the range or 150–300 and the temperature used in the process is somewhat lower due to softening/melting point depression caused by the swelling fluid. Perfluorinated sulfonic acid polymer has a similar melting point range and its softening/melting point will be similarly affected. The pressure of the pressurizing fluid is then reduced sufficiently quickly that gases escape from said fluid-swelled polymer and the escaping gases expand said polymer or polymer precursor into a porous structure. If the fluid is a liquid or supercritical fluid, a phase change will occur to provide the gases to expand the polymer.

The polymer or polymer precursor is cooled to at least partially retain the porous structure. It is preferable in the process for the cooling of the polymer or polymer precursor to at least partially retain the porous structure to be caused by said reduction in pressure. Consequently, it is advantageous for the fluid swelled polymer, at the time of pressure release, to be only slightly above the melting point of the swelled polymer so that the structure imparted by the escaping gases will be quickly "frozen" by the temperature drop caused by the expanding gases. Typically, the process yields a mass of porous polymer which can be cut or broken into particles of the desired size.

During the treatment of hydrocarbon streams containing organic sulfur compounds, this porous highly fluorinated acidic polymer does not adsorb or absorb appreciable quantities of the organic sulfur compounds.

Desulfurization may be carried out by any of the variety of methods that are known in the art for contacting fluid streams with solid catalytic material. These methods include, but are not limited to, slurries, flow through packed tubes or vessels, and fluidized beds. Since the desulfurization generally involves conversion of less volatile and/or caustic-insoluble organic sulfur species, described here as intractable sulfur content, to volatile and/or caustic-soluble sulfur species, a post-treatment devolatilization or caustic wash may remove the converted organic sulfur compounds from the feedstock.

The temperature of the reaction depends upon the feedstock boiling point, the equipment capability, and the convenience of the user. Generally, the temperature range for desulfurization with acidic organic polymer is 20–300° C. Higher temperature will facilitate faster, more complete desulfurization. The upper temperature limit depends upon the acidic organic polymer structure. Commercially available perfluorosulfonic acid polymers as described in U.S. Pat. No. 3,282,875, with an IXR of 14 (EW of 1050) have upper use temperatures of about 250° C. By increasing of the tetrafluoroethylene content of polymers of this type (increasing IXR and EW) use temperatures of about 300° C. or higher can be achieved. The preferred range for the practice of the present invention is 20–250° C., more preferable is 20–200° C., and most preferable is 20–175° C.

Feedstocks may be liquids or gases and may contain a variety of organic sulfur compounds from the simplest, hydrogen sulfide (H$_2$S) through thiols, sulfides and disulfides, to the more complex, such as thiophene and its derivatives. H$_2$S and the lower molecular weight thiols can often be conveniently removed by washing with aqueous caustic soda (sodium hydroxide). It may be desirable to pretreat feedstocks to accomplish the desulfurization for which acidic organic polymer treatment is unnecessary. Furthermore, some organic sulfur compounds are relatively easy to convert to caustic-soluble compounds with acid catalysts less strong that the acidic organic polymers of this invention. Should the feedstocks of interest contain such organic sulfur compounds, it may be desirable to pretreat them with conventional catalysts such as zeolites. Pretreatment can also be done using an activated absorbent such as a Lewis acidic mesoporous silica gel. Other activated absorbents include mesoporous alumina or mesoporous alumina/silica combination. Typical pore size ranges from 6–150 Å (0.6–15 nm), with a surface area of from 200–500 m$^2$/g. Activation is carried out by heating (150° C.–500° C.) to remove water. Such pretreatment may be done separately, or in-line as a first stage treatment before the second stage, desulfurization with acidic organic polymer.

The process of the present invention is especially effective for the removal of intractable organic sulfur compounds. The term "intractable organic sulfur compounds" refers to organic sulfur compounds, for example sulfides and thiophenes, not removable by alkaline extraction. Intractable organic sulfur compounds are converted to sulfur-containing compounds removable by devolatilization or by treatment with a neutral or alkaline medium. There is however, little or no change in the hydrocarbon component of the feedstock.

A particular advantage of the acidic organic polymers described in this patent, especially the fluorinated and more especially the perfluorinated acidic organic polymers, is that, because of their low surface energy, they resist fouling. However, if fouled, they may be easily cleaned. Accumulation of organic material on the surface of the acidic organic polymer catalyst can interfere with contact of the acidic organic polymer catalyst with the feedstock, and thereby slow desulfurization, and perhaps render it less complete. Also, should metal ion salts be present in the feedstock, they may reduce the activity of the acidic organic polymer catalyst. Because of their great chemical stability, the perfluorosulfonic acid acidic organic polymers may be cleaned by a wide variety of means consistent with the nature of the contamination. Those skilled in the art will be familiar with the various techniques, which include, steam cleaning, exposure to oxidizing agents such as chlorine, aqueous solutions of sodium or calcium hypochlorite, or hot nitric acid. Steaming has been found to be particularly effective in cleaning the acidic organic polymers. For the removal of metal ion contamination, exposure to aqueous inorganic acids, preferably hydrochloric acid or nitric acid in the range of 1–10%, is desirable.

The effectiveness of the acidic organic polymer in desulfurization can often be increased by the addition of small amounts of organic compounds capable of donating hydrogen. A preferred compound is cyclohexene. Addition of 0.01–1%, preferably 0.01–0.1% by weight cyclohexene or similar compounds capable of donating hydrogen to the feedstock facilitates the removal of thiophene and/or its derivatives if they are present.

TEST METHODS

Two methods of analysis were used to quantify the amount of organic sulfur contained in the starting hydrocarbon feedstocks and the treated hydrocarbon feedstocks. The first was GC chemiluminescence, described in ASTM method D 5623, which was used to identify organic sulfur compounds in some of the lighter feedstocks. The second method used an ANTEK 9000S sulfur analyzer (Antek Instruments, Inc. Houston, Tex., USA) which was used to quantify sulfur, and is described in ASTM method D 5453-93. Thermal gravimetric analysis was performed according to ASTM method D 3850. H2S coming off the reactor was detected with lead acetate paper.

EXAMPLE 1

This example illustrates the practice of the invention using a porous microcomposite catalyst containing perfluorinated ion-exchange polymer entrapped within and highly dispersed throughout a network of silica. The feed was a yellow (organic sulfur content=0.1%) hydrocarbon light oil, also known as stabilized gas condensate (SGC), was used as the feed. SGC is the liquid component of natural gas, typically $C_5$ and higher hydrocarbons, that is separated from the natural gas in gas processing plants. The gas condensate is stabilized by removing dissolved lower hydrocarbons, such as methane, ethane, and propane, etc., so that $C_{5-7}$ and higher hydrocarbons remain. Washing the SGC with 2 molar aqueous sodium hydroxide solution and treatment with Sulfaclean®, results in the organic sulfur content being reduced by 21%. (Sulfaclean® is an iron-containing granular material, which removes hydrogen. It is sold by The SulfaTreat Company, Chesterfield, Mo., USA). Washing with 1M aqueous NaOH alone reduced organic sulfur content by 1–6%.

To illustrate the invention, the yellow (organic sulfur content=0.1%) hydrocarbon light oil was prefiltered through a 1.5 micron filter. The light oil (500 ml) was placed in a reservoir connected to a HPLC (high pressure liquid chromatography) pump. The light oil was pumped at 1 ml/min through a 0.5 inch (13 mm) diameter×25 cm long column (9.65 g) of acidic organic polymer in the form of porous microcomposites comprising perfluorinated ion-exchange polymer entrapped within and highly dispersed throughout a network of silica as disclosed in U.S. Pat. No. 5,824,622. This porous microcomposite contained 13 wt % polymer which had an equivalent weight of 1050, IXR=14. The tube was at a constant temperature of 145° C. The fluid coming from the tube was initially clear (90 ml), and then turned pale yellow and finally turned a yellow color. Never did the intensity of the yellow color match that of the starting gas condensate. After running for 6.5 hours, all of the samples collected contained anywhere from 300–600 parts per million (ppm) of hydrogen sulfide, and methyl and ethyl mercaptan. No hydrogen sulfide, or methyl or ethyl mercaptan were present in the starting fluid. It was observed that the concentrations of thiophenes and benzothiophenes were initially very low for the clear samples and gradually increased as the run progressed. The levels of these compounds, however, did not exceed the original concentrations in the starting material. The initial 90 ml was washed with aqueous sodium hydroxide (1M) and Sulfaclean®, to yield a pale yellow solution with a reduction in organic sulfur of 80–85%. After 12 hours of operation the combined samples (675 ml), after washing, showed a 75% reduction in organic sulfur content.

The catalyst was then washed with hot toluene and a bright yellow toluene solution was collected. It was found that the yellow toluene contained mainly thiophenes and benzothiophenes as well as many unidentified organic sulfur compounds.

EXAMPLE 2

This example illustrates the practice of the invention in a batch process using perfluorosulfonic acid in the form of 150–450 μm particles.

Waxsol®, sold by Trysol Canada, Ltd, Calgary, Alberta, Canada, is a $C_7$ to $C_{15}$ hydrocarbon based solvent with a density of 0.785 g/cc. The sample used in this example had an organic sulfur content of 1080 ppm. In a round bottom flask fitted with a condenser and an external heater, 100 g of Waxsol® was stirred under a dry atmosphere. Perfluorosulfonic acid polymer of the type disclosed in U.S. Pat. No. 3,282,875 (IXR 14, EW 1050), 10 g, 150–450 sum in size prepared by cryogrinding, was charged to the flask and the oil bath temperature was set at 150° C. The flask contents were at 117° C. Samples of the hydrocarbon were taken at intervals and analyzed for sulfur content. Table 1 summarizes the results.

TABLE 1

| Time (min) | 0 | 10 | 20 | 30 | 40 | 50 | 60 | 90 | 120 |
|---|---|---|---|---|---|---|---|---|---|
| Sulfur (ppm) | 1080 | 570 | 283 | 233 | 187 | 165 | 147 | 99 | 90 |
| % Sulfur reduction | 0 | 47 | 74 | 78 | 83 | 85 | 86 | 91 | 92 |

Procedures for Examples 3–20

The following examples were carried out using a Pyrex (round bottom flask fitted with a condenser and a stirrer, and heated externally. A nitrogen atmosphere was maintained in the flask. The flow-through mode used a HPLC pump and one or two (in tandem) SS316 25 cm long columns with outer diameters of 0.25 inch (6 mm) or 0.5 inch (13 mm), wrapped in heating tape. The temperature was controlled by a digital thermostat. The pressure of the reaction was controlled by a back pressure regulator to keep the hydrocarbon in a liquid phase at high temperatures.

The following feedstocks were used in these examples: SGC A, B, C, D (typically $C_7$–$C_{18}$ hydrocarbons, yellow) were obtained from the Petro Canada Wildcat Hills gas plant and refined by Trysol Canada, Ltd. Heavy distillate (typically $C_{14}$–$C_{25}$ hydrocarbons, pale yellow) and kerosene (typically $C_7$–$C_{18}$ hydrocarbons, colorless) were obtained from the Petro Canada Edmonton refinery. Sylvan Lake gas condensate (typically $C_5$–$C_{12}$ hydrocarbons, pale yellow) was obtained from the Chevron Sylvan Lake gas plant. The starting organic sulfur content of each fluid, done by ASTM method D 5453-93 is as follows: SGC A=965 ppm, SGC B=1834 ppm, SGC C=1744 ppm, SGC D=1270 ppm. Heavy distillate=1470 ppm. Kerosene=27 ppm. Sylvan Lake condensate=13 ppm. Washing with 1 M aqueous NaOH alone reduced organic sulfur content by 1–6%.

To determine sulfur content in the treated samples, the samples were first washed one time with 1M aqueous NaOH and then analyzed by ASTM method D 5453-93. To determine sulfur type, treated samples were analyzed directly using ASTM method D 5623.

The polymer present in all of the catalysts is perfluorosulfonic acid polymer of the type disclosed in U.S. Pat. No. 3,282,875 (IXR 14, EW 1050). In examples using reduced size particles, cryogrinding was used for preparation.

EXAMPLE 3

This example illustrates the effect of dry acidic organic polymer on the rate of desulfurization.

SGC A (90 g) was heated under reflux (117° C.) in the presence of dry perfluorosulfonic acid polymer, 150–425 μm in particle size, (10 g) and stirred for 30 minutes. $H_2S$ was detected. The treated hydrocarbon liquid was washed with 1M aqueous NaOH and then analyzed. Organic sulfur content=377 ppm, a 61% reduction.

EXAMPLE 4

This example illustrates the effect of water on catalyst activity.

SGC B (90 g) was heated under reflux (117° C.) in the presence of double deionized water, wet-towel dried perfluorosulfonic acid polymer, 150–425 μm in particle size, (10 g) and stirred for 120 minutes. $H_2S$ was not detected. The treated hydrocarbon liquid was washed with 1M aqueous NaOH and then analyzed. Organic sulfur content=1590 ppm, a 13% reduction.

EXAMPLE 5

This example illustrates that the effect of water is overcome if means are provided for removing water during reaction.

A Dean-Stark trap was used with the batch mode apparatus. SGC B (90 g) was heated under reflux (117° C.) in the presence of double deionized water, wet-towel dried perfluorosulfonic acid polymer, 150–425 μm in particle size, (10 g) and stirred for 120 minutes. $H_2S$ was detected. Samples of the hydrocarbon were taken at intervals, washed with 1M aqueous NaOH, and analyzed for sulfur content. Table 2 summarizes the results.

TABLE 2

| Time(min) | 10 | 20 | 30 | 60 | 90 | 120 |
|---|---|---|---|---|---|---|
| Sulfur (ppm) | 1575 | 1605 | 1327 | 740 | 403 | 283 |
| % Sulfur reduction | 14 | 13 | 28 | 60 | 78 | 85 |

EXAMPLE 6

This example illustrates that well-dried acidic organic polymer shows increased effectiveness.

A Dean-Stark trap was used with the batch mode apparatus. SGC B (90 g) was dried overnight with $P_2O_5$ and then heated under reflux (117° C.) in the presence of dry perfluorosulfonic acid polymer, 150–425 μm in particle size, (10 g) and stirred for 120 minutes. Large amounts of $H_2S$ were detected. Samples of the hydrocarbon were taken at intervals, washed with 1M aqueous NaOH, and analyzed for sulfur content. Table 3 summarizes the results.

TABLE 3

| Time(min) | 10 | 20 | 30 | 60 | 90 | 120 |
|---|---|---|---|---|---|---|
| Sulfur (ppm) | 1182 | 1107 | 1100 | 666 | 474 | 310 |
| % Sulfur reduction | 36 | 40 | 40 | 64 | 75 | 83 |

EXAMPLE 7

This example illustrates the effect of particle size: acidic organic polymer 0.5–2 mm in size.

SGC D (100 g) was heated under reflux (117° C.) in the presence of dry perfluorosulfonic acid polymer 10–35 mesh (0.5–2 mm) (5 g) and stirred for 30 minutes. $H_2S$ was detected. The treated hydrocarbon liquid was washed with 1M aqueous NaOH and analyzed. GC analysis showed increased levels of $H_2S$ and a 25% decrease in the amount of organic sulfur compounds present in SGC D.

EXAMPLE 8

This example, like Example 7, illustrates the effect of particle size: acidic organic polymer 425 μm in size.

SGC A (90 g) was heated under reflux (117° C.) in the presence of perfluorosulfonic acid polymer, 425 μm in particle size, (10 g) and stirred for 20 minutes. $H_2S$ was detected. The treated hydrocarbon liquid was washed with 1M aqueous NaOH and then analyzed. Organic sulfur content=627 ppm, a 35% reduction.

EXAMPLE 9

This example, like Examples 7 and 8, illustrates the effect of particle size: acidic organic polymer 150–425 µm in size.

SGC A (90 g) was heated under reflux (117° C.) in the presence of dry perfluorosulfonic acid polymer, 150–425 µm in particle size, (10 g) and stirred for 20 minutes. H$_2$S was detected. The treated hydrocarbon liquid was washed with 1M aqueous NaOH and then analyzed. Organic sulfur content=567 ppm, a 41% reduction.

EXAMPLE 10

This example, like Examples 7–9, illustrates the effect of particle size: acidic organic polymer <150 µm in size.

SGC A (90 g) was heated under reflux (117° C.) in the presence of dry perfluorosulfonic acid polymer, <150 µm in particle size, (10 g) and stirred for 20 minutes. H$_2$S was detected. The treated hydrocarbon liquid was washed with 1M aqueous NaOH and then analyzed. Organic sulfur content=494 ppm, a 49% reduction.

EXAMPLE 11

This example illustrates the effect of extended reaction time and small particle size: 5 hours.

SGC D (100 g) was heated under reflux (117° C.) in the presence of dry perfluorosulfonic acid polymer, 1 µm in particle size, (10 g) and stirred for 300 minutes. H$_2$S was detected. The treated hydrocarbon liquid was washed with 1M aqueous NaOH and analyzed. GC analysis after 1 hour showed increased levels of H$_2$S and a 70% decrease in the amount of organic sulfur compounds present in SGC D. After 5 hours an 89% decrease in sulfur content was observed.

EXAMPLE 12

This example illustrates the effectiveness of cyclohexene in enhancing organic sulfur reduction.

SGC D (100 g) was heated under reflux (117° C.) in the presence of dry perfluorosulfonic acid polymer, 1 µm in particle size, (10 g) and cyclohexene (1 ml) and stirred for 300 minutes. H$_2$S was detected. The treated hydrocarbon liquid was washed with 1M aqueous NaOH and analyzed. GC analysis after 1 hour showed increased levels of H$_2$S and an 83% decrease in the amount of organic sulfur compounds present in SGC D. After 5 hours a 95% decrease in organic sulfur content was observed. Gas chromatographic analysis of the feedstock before and after treatment with the perfluorosulfonic acid polymer showed no change in the hydrocarbon components.

EXAMPLE 13

This example illustrates the effectiveness of acidic organic polymer with feedstocks low in organic sulfur content.

Kerosene (98 g) was heated to 150° C. in the presence of dry perfluorosulfonic acid polymer, <150 µm in particle size, (2 g) and stirred for 120 minutes. H$_2$S was detected. Samples of the hydrocarbon were taken at intervals, washed with 1M aqueous NaOH, and analyzed for sulfur content. Table 4 summarizes the results.

TABLE 4

| Time(min) | 10 | 20 | 30 | 60 | 90 | 120 |
|---|---|---|---|---|---|---|
| Sulfur (ppm) | 27 | 23 | 22 | 20 | 21 | 20 |
| % Sulfur reduction | 0 | 15 | 18 | 26 | 22 | 26 |

EXAMPLE 14

This and the following examples illustrate the effectiveness of acidic organic polymer in continuous desulfurization.

The acidic organic polymer was perfluorosulfonic acid 150–450 µm in size. They were done in the flow-through mode using a HPLC pump and one or two (in tandem) SS316 25 cm columns with an outer diameter of 0.25 inch (6 mm) or 0.5 inch (13 mm), wrapped in heating tape, the temperature being controlled by a digital thermostat. The pressure of the reaction was controlled by a back pressure regulator to keep the hydrocarbon in the liquid phase at high temperatures.

Sylvan lake condensate was passed through a heated 0.25 inch (6 mm) diameter column (150° C.) filled with perfluorosulfonic acid polymer, 150–425 µm in size, (4.90 g) for 4 hours at a flow rate of 0.2 ml/minute. H$_2$S was detected. The treated hydrocarbon liquid was washed with 1M aqueous NaOH and then analyzed. Organic sulfur content=3 ppm, a 77% sulfur reduction. No change in the color of the treated fluid was observed.

EXAMPLE 15

This example illustrates the effect of acidic organic polymer in the form of porous microcomposite on a continuous stream of hydrocarbon at various temperatures.

SGC A was passed through a 0.25 inch (6 mm) diameter column (23–300° C.) filled 2.10 g of the porous microcomposite described in Example 1 except that it had 25 wt % polymer. Particle size was 1–3 mm. The column was heated for 1 hour at each temperature at a flow rate of 0.2 ml/minute. H$_2$S was detected. Samples of the hydrocarbon were taken at each temperature, washed with 1M aqueous NaOH, and analyzed for organic sulfur content. The decline in sulfur reduction when the temperature is raised is an indication of desorption of organic sulfur compounds from the catalyst. Table 5 summarizes the results.

TABLE 5

| Temperature (° C.) | 23 | 100 | 150 | 200 | 250 | 300 |
|---|---|---|---|---|---|---|
| Sulfur (ppm) | 698 | 770 | 99 | 160 | 193 | 306 |
| % Sulfur reduction | 28 | 20 | 90 | 83 | 80 | 68 |

Thermal gravimetric analysis (TGA) showed no degradation of the sulfonic acid sites on the polymer and no significant contaminants on the catalyst.

EXAMPLE 16

This example illustrates the performance, as a function of time, of perfluorosulfonic acid 150–450 µm in size on a continuous stream of hydrocarbon at various temperatures.

SGC A was passed through a heated 0.25 inch (6 mm) diameter column (23–250° C.) filled with perfluorosulfonic acid polymer, 150–425 µm in particle size, (4.60 g) for 1 hour at each temperature at a flow rate of 0.2 ml/minute. H$_2$S was detected. Samples of the hydrocarbon were taken at each temperature, washed with 1M aqueous NaOH, and analyzed for organic sulfur content. In contrast to Example 15, as the temperature was raised, sulfur reduction increased indicating little or no adsorption or absorption of organic sulfur compounds on the catalyst. Table 6 summarizes the results.

TABLE 6

| Temperature (° C.) | 23 | 100 | 150 | 200 | 250 |
|---|---|---|---|---|---|
| Sulfur (ppm) | 905 | 690 | 314 | 306 | 167 |
| % Sulfur reduction | 6 | 29 | 68 | 68 | 83 |

EXAMPLE 17

This example illustrates continuous operation without back pressure on the system, which allows partial vaporization of the feed. The acidic organic polymer was in the form of porous microcomposite.

No back pressure valve was used. SGC D was passed through a 0.5 inch (13 mm) diameter column filled with 9.65 g of the porous microcomposite of Example 1 (13 wt. % polymer). Particle size was 1–3 mm. The column was heated at 145° C. for 11.25 hours at a flow rate of 1 ml/minute. $H_2S$ was detected the whole time. The samples collected (every 15 minutes) during the reaction show the formation of hydrogen sulfide, and methyl and ethyl mercaptans, which started at a concentration of 676 ppm for all three components, and finished at 423 ppm after 11.25 hours. For the first 7.5 hours the hydrocarbon fluid that was collected was colorless. Over the remaining 2.75 hours the yellow color reappeared. During the course of the run a decrease in the remaining organic sulfur content was observed. A 1M aqueous NaOH washed sample of the entire treated volume showed a 75% reduction in organic sulfur content.

EXAMPLE 18

This example is similar to Example 18 with the addition of a silica containing column before the column containing acidic organic polymer.

No back pressure valve was used. SGC D was passed through two 0.5 inch (13 mm) diameter columns in tandem), with the first one filled with 8 g of silica (100 Å (10 nm), 300 m²/g, mesh 70–230 (0.05–0.2 mm in size)) and the second one with 9.6 g of the porous microcomposite of Example 15. Particle size was 1–3 mm. The columns were heated to 145° C. for 12.5 hours at a flow rate of 1 ml/minute. $H_2S$ was detected during the whole course of the run. The samples collected (every 15 minutes) during the reaction show the formation of hydrogen sulfide, and methyl and ethyl mercaptans, which starts at a concentration of 477 ppm for all three components, and finished at 157 ppm after 12.5 hours. For the first 3.5 hours the hydrocarbon fluid that was collected was colorless, over the remaining 9 hours the yellow color reappeared. During the run a decrease in the remaining organic sulfur components was observed. A 1M aqueous NaOH washed sample of the entire treated volume showed a 85% reduction in organic sulfur content.

EXAMPLE 19

This example illustrates the performance of acidic organic polymer catalyst during an eleven-day period.

SGC A was passed through a 0.25 inch (6 mm) diameter column 2.05 g of the porous microcomposite of Example 15. Particle size was 1–3 mm. The column was heated to 200° C. for 264 hours at a flow rate of 0.2 ml/minute. $H_2S$ was detected. The treated hydrocarbon liquid was sampled every 24 hours, washed with 1M aqueous NaOH and analyzed. Table 7 summarizes the results.

TABLE 7

| Time (hrs) | 24 | 48 | 72 | 96 | 120 | 144 | 168 | 192 | 216 | 240 | 264 |
|---|---|---|---|---|---|---|---|---|---|---|---|
| Sulfur (ppm) | 290 | 315 | 372 | 434 | 584 | 650 | 720 | 657 | 792 | 834 | 740 |
| % Sulfur reduction | 70 | 67 | 62 | 55 | 40 | 33 | 25 | 32 | 18 | 14 | 23 |

EXAMPLE 20

This example illustrates the use of porous acidic organic polymer with repeated cleaning treatments to remove fouling.

Porous acidic organic polymer was made by combining 50 parts of the perfluorosulfonic acid polymer in the precursor sulfonyl fluoride form as described in U.S. Pat. No. 3,282,875 with 150 parts of sulfur dioxide in a pressure vessel. The vessel was sealed and heated to 250° C. with shaking for 3 hours. The vessel was cooled to 200° C. and vented. The cylindrical product was pressed between aluminum foil in a hydraulic press. After two hours the compressed polymer recovered its original thickness. The polymer was cut into pieces about 2 mm in size. The pieces were hydrolyzed in a solution of 56 wt % water, 30 wt % dimethyl sulfoxide, and 14 wt % potassium hydroxide, with heating on a steam bath for three days. The polymer was washed in deionized water and then immersed in 600 ml solution of 10 wt % concentrated nitric acid and 90 wt % water for acid exchange. Afterwards the polymer was washed with deionized water until the water remained at pH 6. The polymer was then dried. The polymer was ground into particles having a particle size of about 1–3 mm. The surface area of this porous acidic organic polymer is 0.05 m²/g.

SGC B and B' (S=1920 ppm) and C (S=1744 ppm), C' (S=1551 ppm) and C" (S=1589 ppm) was passed through a heated 0.5 inch (13 mm) inch column (200° C.) filled with porous perfluorosulfonic acid polymer prepared as described above, (1.10 g) and quartz sand (27.8 g) at a flow rate of 1.0 ml/minute. $H_2S$ was detected. The treated hydrocarbon liquid was sampled every 24 hours, washed with 1M aqueous NaOH and then analyzed. Table 8 summarizes the results.

TABLE 8

| Time (hrs) | 24 | 48 | 72 | 96 | 120 | 144 | 168 | 192 | 216 |
|---|---|---|---|---|---|---|---|---|---|
| Sulfur (ppm) | 1456 | 1666 | 1666 | 1673 | 1682 | 1676 | 1721 | 1667 | 1791 |
| % Sulfur reduction | 24 | 13 | 13 | 13 | 12 | 12 | 10 | 13 | 7 |

After 240 hours, the column was cleaned out with steam at 150° C., flow rate=2 ml/minute for 45 minutes, and dried with $N_2$ gas at 150° C. for 60 minutes. The reaction was restarted at 200° C. with SGC C and a flow rate of 1 ml/minute. Samples of the hydrocarbon were taken at intervals, washed with 1M aqueous NaOH, and analyzed for sulfur content. Table 9 summarizes the results.

TABLE 9

| Time(hrs) | 264 | 288 | 312 | 336 |
|---|---|---|---|---|
| Sulfur (ppm) | 1578 | 1410 | 1405 | 1521 |
| % Sulfur reduction | 10 | 19 | 19 | 13 |

After 336 hours, the column was cleaned out with steam at 175° C., flow rate=2 ml/minute for 20 hours, and dried with $N_2$ gas at 175° C. for 60 minutes. The reaction was restarted at 200° C. with SGC C and a flow rate of 1 ml/minute. Samples of the hydrocarbon were taken at intervals, washed with 1M aqueous NaOH, and analyzed for sulfur content. Table 10 summarizes the results.

TABLE 10

| Time(hrs) | 360 | 384 | 408 |
|---|---|---|---|
| Sulfur (ppm) | 1403 | 1274 | 1285 |
| % Sulfur reduction | 20 | 27 | 26 |

After 408 hours, the column was cleaned out with 1% $H_2SO_4$ in double deionized water while heated to 170° C. The flow rate=2 ml/minute for 2 hours. The column then washed with double deionized $H_2O$ for 18 hours until non-acidic and dried with $N_2$ gas at 175° C. for 60 minutes. The reaction was restarted at 200° C. with SGC C, C' and C" and a flow rate of 1 ml/minute. Samples of the hydrocarbon were taken at intervals, washed with 1M aqueous NaOH, and analyzed for sulfur content. Table 11 summarizes the results. Table 11.

TABLE 11

| Time (hrs) | 432 | 456 | 480 | 504 | 528 | 552 | 576 | 600 | 624 | 648 | 672 | 696 | 720 | 744 |
|---|---|---|---|---|---|---|---|---|---|---|---|---|---|---|
| Sulfur (ppm) | 1237 | 1369 | 1330 | 1299 | 1258 | 1294 | 1326 | 1375 | 1282 | 1263 | 1258 | 1313 | 1522 | 1407 |
| % Sulfur reduction | 29 | 25 | 28 | 29 | 19 | 19 | 17 | 14 | 19 | 21 | 21 | 17 | 4 | 11 |

In the course of this example 35 kg of SGC was passed over the 1.1 g of porous perfluorosulfonic acid polymer catalyst without degradation of the catalyst. This is a ratio of about 32000:1.

EXAMPLE 21

This example illustrates the effectiveness of porous organic acid polymer in treating a hydrocarbon gas stream.

An organic sulfur containing LPG (liquefied petroleum gas containing propane and higher hydrocarbons in addition to organic sulfur compounds) was contacted with a fixed bed of porous perfluorosulfonic acid catalyst prepared as in Example 20 (1.25 g), heated to 120° C., and flowing at a rate of 60 cc/min. The apparatus consisted of a gas cylinder connected to a glass bomb #1 (before sample) which was in turn connected to the heated 0.25 inch (6 mm diameter)×25 cm column. The off gases from the column were pushed into another glass bomb #2 (after sample). The GC analysis was carried out by sampling from the glass bombs after a 20 minute run time. The treated hydrocarbon gas was analyzed. Table 12 summarizes the results (ppm=parts per million). GC analysis showed increased levels of $H_2S$.

TABLE 12

| Sulfur Component | PPM before | PPM after |
|---|---|---|
| Hydrogen sulfide | 1.2 | 103 |
| Carbonyl sulfide | 7 | 8.3 |
| Methyl mercaptan | 1857 | 1658 |
| Ethyl mercaptan | 630 | 529 |
| Dimethyl sulfide | 28 | 1 |
| Carbon disulfide | 0 | 0 |
| Iso-propyl mercaptan | 205 | 108 |
| Tert-butyl mercaptan | 7.4 | 1 |
| N-propyl mercaptan | 24 | 20 |
| Methyl ethyl sulfide | 8.1 | 0 |
| Sec-butyl mercaptan/Thiophene | 26 | 5.9 |
| Iso-butyl mercaptan | 0 | 0 |
| Diethyl sulfide | 0 | 0 |
| N-butyl mercaptan | 1.4 | 1.3 |
| Dimethyl disulfide | 14 | 17 |
| Diethyl disulfide | 2.7 | 4.5 |

What is claimed is:

1. A process for reducing the organic sulfur content of a hydrocarbon stream comprising contacting said stream with a fluorinated acidic organic polymer, the temperature of the hydrocarbon stream being at least about 20° C., said contacting of said stream with said fluorinated acidic organic polymer causing at least part of said organic sulfur content to be converted to sulfur-containing compounds removable by devolatilization or by treatment with a neutral or alkaline medium.

2. The process of claim 1 wherein at least part of said organic sulfur content is converted to hydrogen sulfide.

3. The process of claim 1 further comprising removing said sulfur-containing compounds by devolatilization or by treatment with a neutral or alkaline medium.

4. The process of claim 1 in which said fluorinated acidic organic polymer is a highly fluorinated acidic organic polymer.

5. The process of claim 1 in which said fluorinated acidic organic polymer is a perfluorinated acidic organic polymer.

6. The process of claim 1 wherein said fluorinated acidic organic polymer has sulfonic acid groups.

7. The process of claim 1 wherein said organic sulfur content comprises intractable organic sulfur compounds.

8. The process of claim 1 in which the temperature of the hydrocarbon stream is between about 20° and about 300° C.

9. The process of claim 1 in which the temperature of the hydrocarbon stream is between about 20° and about 250° C.

10. The process of claim 1 in which the temperature of the hydrocarbon stream is between about 20° and about 200° C.

11. The process of claim 1 in which the temperature of the hydrocarbon stream is between about 20° and about 175° C.

12. The process of claim 1 wherein said fluorinated acidic organic polymer is in a form having a surface area of at least about 0.01 m$^2$/g.

13. The process of claim 1 wherein said fluorinated acidic organic polymer is in a form having a surface area of at least about 0.1 m$^2$/g.

14. The process of claim 1 wherein said fluorinated acidic organic polymer is in the form of porous catalyst having a surface area of about 0.01 m$^2$/g to about 5 m$^2$/g and being free of pores having a size of about 1.7 to about 300 nm.

15. The process of claim 1 in which said fluorinated acidic organic polymer is in the form of particles less than about 450 μm in size.

16. The process of claim 1 in which said fluorinated acidic organic polymer is in the form of particles less than about 150 μm in size.

17. The process of claim 1 in which an organic compound is added with the fluorinated acidic organic polymer, said organic compound being capable of donating hydrogen in acid-catalyzed reactions.

18. The process of claim 17 in which said organic compound is cyclohexene.

19. The process of claim 1 which is conducted in the absence of added hydrogen gas.

* * * * *

UNITED STATES PATENT AND TRADEMARK OFFICE
CERTIFICATE OF CORRECTION

PATENT NO. : 6,231,755 B1 Page 1 of 1
DATED : May 15, 2001
INVENTOR(S) : Shaun Terrance Einar Mesher, Ralph Birchard Lloyd and Edward G. Howard It is certified that error appears in the above-identified patent and that said Letters Patent is hereby corrected as shown below:

Title page,
Item [73], Assignee, should be corrected to read:
-- [73] Assignee: E. I. du Pont de Nemours and Company, Wilmington, DE (US) and Trysol Canada Limited, Calgary, Alberta Canada --

Signed and Sealed this

Twenty-first Day of January, 2003

JAMES E. ROGAN
*Director of the United States Patent and Trademark Office*